United States Patent [19]

Moynihan

[11] Patent Number: 5,569,701
[45] Date of Patent: Oct. 29, 1996

[54] SOYBEAN OIL-BASED INTAGLIO INK AND METHOD FOR MAKING SAME

[75] Inventor: John T. Moynihan, Herndon, Va.

[73] Assignee: Bureau of Engraving and Printing, Washington, D.C.

[21] Appl. No.: 455,994

[22] Filed: May 31, 1995

[51] Int. Cl.$^6$ .............................. C08L 67/08; C08L 61/10; C09D 11/26; C09D 11/10
[52] U.S. Cl. .................. 524/539; 524/540; 524/541; 523/160; 523/161; 523/500; 528/295.5; 126/23 E; 126/22 E; 126/27 R; 126/28 R; 126/28 A
[58] Field of Search .................. 106/23 E, 22 E, 106/27 R, 28 R, 28 A; 523/160, 161, 500; 524/539, 540, 541; 528/295.5

[56] References Cited

U.S. PATENT DOCUMENTS

| | | | |
|---|---|---|---|
| 3,951,892 | 4/1976 | Drury, Jr. et al. | 106/29 R |
| 4,028,118 | 6/1977 | Nakasuji et al. | 106/21 E |
| 4,032,354 | 6/1977 | Fraser | 106/28 R |
| 4,094,836 | 6/1978 | Yasui et al. | 523/501 |
| 4,253,580 | 3/1981 | Doi et al. | 215/228 |
| 4,421,560 | 12/1983 | Kito et al. | 106/21 E |
| 4,446,301 | 5/1984 | Belote et al. | 523/161 |
| 4,649,173 | 3/1987 | Schmidt | 524/541 |
| 4,740,567 | 4/1988 | Schmidt | 524/539 |
| 4,756,760 | 7/1988 | Rudolph | 106/28 R |
| 4,764,215 | 8/1988 | Rudolph | 106/23 E |
| 4,966,628 | 10/1990 | Amon et al. | 106/23 E |
| 5,085,911 | 2/1992 | Kato et al. | 428/65.6 |
| 5,100,934 | 3/1992 | Glesias | 106/20 R |
| 5,122,188 | 6/1992 | Erhan et al. | 106/28 R |
| 5,144,014 | 9/1992 | Sugamo et al. | 106/23 K |
| 5,336,647 | 8/1994 | Naé et al. | 501/146 |
| 5,338,344 | 8/1994 | Bondurant | 106/2 |
| 5,367,005 | 11/1994 | Nachfolger | 524/608 |

OTHER PUBLICATIONS

The Condensed Chemical Dictionary, Seventh Edition Arthur and Elizabeth Rose, Reinhold Publishing Co. N.Y. p. 1001.

*Primary Examiner*—Peter A. Szekely
*Attorney, Agent, or Firm*—Watson Cole Stevens Davis, P.L.L.C.

[57] ABSTRACT

Disclosed is an intaglio ink comprising a varnish comprising an alkyd-modified soybean oil and method for producing same. Preferably, the alkyd-modified soybean oil is made by combining soybean oil, pentaerythritol and trimellitic anhydride at elevated temperature. The varnish may further comprise a thermoplastic phenolic resin. Methods of making the alkyd modified soybean oil, thermoplastic phenolic resin, the varnish and the ink are also disclosed.

20 Claims, No Drawings

5,569,701

SOYBEAN OIL-BASED INTAGLIO INK AND METHOD FOR MAKING SAME

BACKGROUND OF THE INVENTION

1. Field of the Invention

The invention relates to a new and unique varnish formulation derived from vegetable-based (soybean) rather than petroleum-based oils. Ink pigments and other ingredients are added to the varnish which serves as the vehicle for the intaglio inks used in the production of United States currency and other obligations and securities. Intaglio inks are unlike offset and flatbed inks in that they are extremely viscous, high-solid inks and not conducive to use in these other printing processes.

2. Background Discussion

The United States Bureau of Engraving and Printing is the agency responsible, under 31 U.S.C. §5114, for the production of United States currency, as well as other obligations and securities. The Bureau is by far the largest banknote house in the world. The Bureau produces more currency notes than the seven next largest producers combined.

31 U.S.C. §5114 requires that currency be manufactured by the intaglio printing process which involves the use of engraved plates. Because the image to be reproduced is engraved below the surface of the printing plate, it is necessary to cover the entire printing plate with ink, forcing the ink into the engraving, and then wipe away all the excess ink remaining upon the surface of the plate. A "distinctive" rag (75% cotton/25% linen) banknote paper is then forced into the engraving by several tons of pressure to lift the inked image from the plate. This "distinctive" paper is adopted by the Secretary of the Treasury, under the provisions of 18 U.S.C §474a, for the exclusive use of the United States. The mere possession of this paper without proper authority is criminally punishable.

Intaglio ink comprises a varnish, pigments, emulsifiers, extenders, wax, solvents, mineral oil, driers and deionized water.

Nearly eighty percent (80%) of the high-solid intaglio ink applied to the printing plate is wiped away and, except to the extent it can be captured and reconstituted, it becomes a costly waste product. Although not required by law, the Bureau has been disposing of its excess ink in secure landfills, as if the ink were hazardous waste, as a precaution against the future inclusion of the chemically-based varnish or other ingredients in EPA's list of hazardous chemicals. Despite the high cost of this printing process, resulting from the waste of excess ink and the cost of its environmentally safe disposal, the process remains an integral part of currency production because it results in a three dimensional printed image. This image is a primary deterrent to counterfeiting. For these reasons, the use of large scale intaglio printing is predominantly limited to banknote houses.

Until the early 1980s, currency presses utilized a paper-wiping system to remove the currency ink from the printing plates. The inks utilized by the Bureau of Engraving and printing for these paper-wipe presses were manufactured, for the most part, in-house and were not proprietary to any private contractor or the Bureau. However, the Bureau's ink formulas were classified.

The demands for currency production were steadily increasing at this point in time and projected to greatly increase over the next decade. In fact, the Bureau has gone from producing approximately 3 billion notes per year at the outset of the last decade to more than 9 billion notes at the start of this decade. In the early 1980s, the Bureau began to replace its outdated and worn currency presses with new and more technically advanced press equipment. New intaglio press equipment no longer utilized paper-wipe systems, but had adopted new water-wipe or cylinder-wipe systems.

The new wiping system utilizes rubberized rollers (cylinders) to remove the ink from the printing plate. The cylinders are coated with a wiping solution consisting of caustic soda and castor oil which, in conjunction with scrapers (doctor blades), facilitates the removal of the ink. It was soon discovered that the cylinder-wipe system on the new presses necessitated the use of new ink formulation. As a result, the Bureau began to acquire its ink from a private company which considered the formulations for the inks and, in particular, the ink varnishes to be proprietary.

The current process for printing security documents, especially currency, is sheetfed non-heatset intaglio. Sheet fed non-heatset intaglio inks are based on oxidizable resins and alkyds and are very slow drying. Typically, one side of the currency is printed first and after 24–48 hours, the other side is printed. The typical maximum printing speed of such inks is about 75 m/min. U.S. Pat. No. 4,966,628 discloses typical non-heatset sheet fed intaglio inks suitable for printing of security documents.

The term "intaglio printing" refers to a printing process wherein a printing cylinder or printing plate carries the engraved pattern and the engraved recess is filled with printing ink to be transferred to the printing substrate in order to create the document. In this type of printing, typically a rotating engraved cylinder (usually manufactured from steel, nickel or copper and plated with chromium) is supplied with ink by one or more template inking cylinders by which a pattern of inks of different color is transferred to the printing cylinder. Any excess ink on the surface of the cylinder is then wiped off by a rotating wiper cylinder covered by a plastisol, using a dilute aqueous solution of sodium hydroxide and sulfonated castor oil as an emulsifying medium for the wiped-off excess ink. Thereafter, the printing pattern is transferred under a pressure of up to 105 kg/cm$^2$ to the substrate.

Recently, a heatset intaglio printing ink was developed at the laboratories of the assignee. Such ink is described in U.S. Pat. No. 5,100,934 assigned to the same assignee. The inks described in the '934 patent permitted security documents, especially currency, to be printed by heatset intaglio, thereby resulting in an improved product and in a printing process which permits the obverse of the printed document to be printed an instant after printing the face. However, the inks described in the '934 patent require relatively high heatset temperatures. While such high temperature insure very rapid drying and high throughput rates, the high heatset temperatures also tend to produce undesirable yellowing and/or crinkling of the paper substrate.

A security document intaglio printing ink should meet the following requirements:

(a) correct rheological properties in respect to transfer of the ink to the printing cylinder and transfer therefrom to the substrate;

(b) ability of the excess ink to be easily and quantitatively removed from the non-image areas of the die surface by the wiping cylinder (wipeability);

(c) ease of cleaning the wiping cylinder by means of a cleanser such as dilute aqueous caustic soda solution containing about 1% NaOH and 0.5 % sulfonated castor oil or other surfactants;

(d) stability of the ink on the printing rollers; i.e. control of the evaporation of volatile materials during the printing process to prevent premature drying of the ink on the rollers;

(e) film-forming characteristics allowing handling of the paper carrying printed films of up to 200μ thickness immediately after printing;

(f) proper drying properties when printing at speeds of up to 200 m/min. with engravings of up to 200μ thickness;

(g) outstanding chemical and mechanical resistance of the printed document pursuant to specifications established by INTERPOL at the 5th International Conference on Currency and Counterfeiting in 1969 and by the U.S. Bureau of Engraving and Printing in BEP 88-214 (TN) §M5.

To be useful as an intaglio ink for currency, the ink on the currency is tested to determine if it passes tests such as the following:

(a) chemical resistance to solvents, acids, alkalies, soaps and detergents;

(b) ink film integrity rub test;

(c) crumple test;

(d) laundering test;

(e) soiling test;

(f) humidity and temperature stability;

(g) flexing test;

(h) fade resistance test; and (i) magnetic properties test.

Environmental and worker safety requirements for these inks are also very important. Pursuant to applicable environmental statutory and regulatory requirements placed on Bureau operations, the level of volatile organic compounds (VOCs) in the currency inks were subject to specific limitations. Periodic testing (required by the Bureau's operating permits) of samples of the ink supplied by a private contractor established that the ink was not always within these limitations. Moreover, Bureau employees have complained of noxious odors from some batches of ink, but not others. Employees claimed problems with chemical sensitization and other health problems despite the fact that the material safety data sheets accompanying the ink indicated no toxic materials or other hazards present in the ink. Without access to the formulations of the private contractor-supplied inks, investigation of these problems was greatly hampered.

Moreover, the U.S. House of Representatives Committee on Appropriations, has also requested promoting American agricultural products and reducing dependency on petroleum through the use of soybean oil-based inks in the production of U.S. securities at the Bureau of Engraving and Printing (BEP). In addition, soybean oil is one of our largest agricultural crop by-products and about 20% of the bean being soybean oil. The search for industrial markets such as inks will eventually provide the American farmer with increased markets for his products. The United States is the world's largest producer of soybeans and is a major exporter of the product to other countries. The soybean market is much more stable compared to the price of petroleum: there have been no major drops or upward spikes since soybean oil was developed.

Although changes in the design and appearance of currency are rare, changes in ink formulations have become a relatively common occurrence. As indicated above, changes in the ink formulations were necessitated by new production equipment and processes. The increased focus over the past two decades in the areas of environmental quality and occupational safety have led to regulatory requirements concerning an ever increasing number of materials. Elimination of an ink ingredient in favor of a more environmentally sound or occupationally safe ingredient has resulted in other problems with ink adhesion and print durability.

The Bureau has not always been able to adequately address the above problems through the acquisition of inks from private industry. Due to the unique nature and limited use of intaglio inks, they are not widely manufactured and research development of this ink technology is not broadly available.

OBJECTS OF THE INVENTION

It is an object of the present invention to provide a soybean oil based intaglio ink.

It is another object of the present invention to provide a soybean oil based intaglio ink of suitable durability and chemical resistance to serve in currency notes.

It is another object of the present invention to provide a process for making a soybean oil based intaglio ink.

These and other objectives are achieved by the present invention as described below.

SUMMARY OF THE INVENTION

The present invention provides an intaglio ink comprising alkyds synthesized at least in part from soybean oil. The alkyds are in a varnish portion of the ink. Optionally, the varnish also includes solvent.

The alkyd comprises a reaction product of soybean oil, and optionally tung oil and/or linseed oil, trimellitic anhydride, pentaerythritol and catalyst. The varnish may further comprise a thermoplastic phenolic resin comprising the reaction product of a mixture of t-butyl phenol, bisphenol, formaldehyde and acid, e.g., oxalic acid. Alkyds made from a mixture constituting about 5 to about 50 weight percent soybean oil are satisfactory. Preferably, the soybean oil constitutes about 5 to about 30 weight percent of the varnish. Higher levels of soybean oil do not have sufficient chemical resistance in inks. The varnish may also include solvent and/or drying oil which has not been alkydated. The varnish is formulated into cylinder-wipe currency ink, or as ink for intaglio postage stamps or securities, by addition of pigments, emulsifiers, and other ingredients. The ink may be colored green, black or another typical color.

The present invention also provides a method for making intaglio inks. The method comprises mixing catalyst, e.g., lithium acetate or sodium hydroxide, soybean oil, optionally tung oil and/or linseed oil, and pentaerythritol at a temperature from about 180° to about 220° C. for about 0.5 to about 1.5 hours to cause alcoholysis. The trimellitic anhydride is added to the mixture at about 165° to about 180° C. and the mixture is held at this temperature for about 10 to about 30 minutes to make the alkyd. Typically, the mixture is refluxed during this time. Optionally, the phenolics and/or solvent and/or drying oil are blended with the alkyd-containing mixture to make the varnish. Then, the varnish and other ingredients, e.g., pigments and emulsifiers are mixed to make the intaglio ink. The emulsifier is insoluble in water at room temperature to provide currency with good handling characteristics. However, the emulsifier should be soluble in water at 60° C. Wiper rolls typically wash excess ink off currency "white" areas at 60° C., so the printer can subsequently print fine lines on the currency.

The present invention has the following advantages:

It increases the durability and chemical resistance of currency notes.

It reduces the environmental impact of Bureau operations through the use of vegetable-based ink varnish, rather than petroleum-based ink varnish. Moreover, environmental considerations have been a large factor in promoting the use of edible soybean oil in inks which contact the public and must be acceptable for waste disposal. The Clean Air Act requires the reduction of volatile organic compounds (VOC's) by the 15% in the first three years after the Act is passed and five to 50% after that until Federal Standards are met. Although not free of VOC's, soybean-based inks produce minimal vapors.

It reduces the costs of manufacture through the use of more economically produced ink varnish and the reduction in cost of waste disposal.

It alleviates complications and/or problems in the administration of Bureau of Engraving and Printing occupational safety and health programs caused by a lack of information regarding the proprietary ink ingredients and formulations of private contractors.

The present invention is also advantageous for soybean-based postage stamp and security inks which have the same problems of waste ink disposal and environmental requirements as currency inks.

DETAILED DESCRIPTION OF THE PREFERRED EMBODIMENTS

The present invention provides an intaglio ink comprising alkyds synthesized at least in part from soybean oil. The inks comprise about 5 to about 30 weight percent varnish, about 15 to about 50 weight percent pigment, about 0.5 to about 10 weight percent emulsifier (i.e., surfactant), about 10 to about 50 weight percent extenders, about 1 to about 10 weight percent wax, about 0 to about 12 weight percent mineral oil, about 0.5 to about 10 weight percent glycols and/or glycol ethers, about 0.1 to about 5 weight percent driers, about 0 to about 20 weight percent water, about 0 to about 25 weight percent raw tung oil or other drying oils, about 0 to about 25 weight percent alkyds (other than those in the varnish), about 0 to about 25 weight percent phenolic resins (other than those in the varnish), and other additives conventionally employed in intaglio ink compositions.

THE VARNISH

The varnish comprises about 30 to about 100 (preferably about 50 to about 90) weight percent alkyd, 0 to about 70 (preferably about 5 to about 30) weight percent thermoplastic phenolic resin, and about 0 to about 20 weight percent solvent.

The alkyd portion of the varnish comprises the reaction product a mixture of about 5 to about 50 (preferably about 10 to about 30) weight percent soybean oil, 0 to about 70 (preferably about 20 to about 70) weight percent tung oil or linseed oil, about 5 to about 30 (preferably about 10 to about 20) weight percent trimellitic anhydride, about 0.05 to about 2 (preferably about 0.05 to about 0.5) weight percent catalyst, and about 2 to about 10 (preferably about 2 to about 5) weight percent pentaerythritol. About 0 to about 25 weight percent solvent may also be in the reaction mixture. Typical catalyst includes metallic oxides, metallic hydroxides, e.g., sodium hydroxide, lithium acetate di-hydrate, or other acetates. The preferred catalyst is lithium acetate di-hydrate. A typical solvent is MAGIESOL 44 oil manufactured by Magie Brothers Oil Company, Franklin Park, Ill. The solvent is especially useful to reduce viscosity if the alkyd is mixed with the phenolic described below. Preferably, the alkyd has an acid number of about 60 to about 75 prior to adding solvent, and a mixture of solvent and alkyd would have an acid number of about 50 to about 60.

The alkyd is made by mixing the soybean oil, and optional tung oil and/or linseed oil, with pentaerythritol and catalyst and heating the mixture. When the white pentaerythritol solid is dissolved, the mixture has been sufficiently heated. Typically, this occurs by holding the mixture at about 180° to about 220° C. for about ½ to about 1½ hours. This achieves alcoholysis of the mixture. Then the mixture is set to a temperature of about 165° to about 180° C., trimellitic anhydride is added to the mixture and the mixture is kept at this temperature for about 10 to about 30 minutes. Typically, these ingredients are mixed under reflux. This step makes the alkyd(s).

The thermoplastic phenolic resin is a novolak resin which is oil soluble and has a melting point of about 140° to about 200° C., preferably about 140° to about 180° C. A typical suitable phenolic is the reaction product of a mixture of about 30 to about 90 weight percent alkyl-modified phenol, about 5 to about 25 weight percent of unsubstituted or partially substituted bisphenol, and a formaldehyde source, combined in the presence of an acid. The alkyl modified phenols include preferably nonylphenol or tert-butyl phenol, most preferably tert-butyl phenol. The bisphenol is preferably bisphenol A. The formaldehyde source is preferably formalin (solution of water and 30% formaldehyde), trioxane (a trimer of formaldehyde) or most preferably, paraformaldehyde. The acid is oxalic acid, maleic acid, phosphoric acid, or organic mono or dibasic acids. Preferably oxalic acid is employed.

Typically, the phenolic is made by mixing the ingredients at a temperature of about 130° which gradually increases to about 300° C. over a period of about three to four hours. then the mixture is cooled and solidified. The solid phenolic is then flaked.

In place of making one's own phenolic, a suitable phenolic such as K1111, manufactured by Lawter International, Inc., Northbrook, Ill., may be employed.

The resin flake and varnish (alkyd with solvent) are mixed at a temperature and for a time sufficient to dissolve the resin flake. A typical suitable mixing occurs at conditions of 175° C. for 10 minutes.

If desired, a solvent such as drying oil, hydrocarbon oil or glycols may be added to the mixture of alkyd and phenolic resin to reduce the viscosity of the varnish. Typical hydrocarbon oils suitable as solvent include MAGIESOL 52 oil and 44 oil. These are hydrotreated hydrocarbon oils manufactured by Magie Brothers Oil Company, Franklin Park, Ill. Typical solvents also include one or more glycols, such as hexylene glycol, ethers of glycols 470 oil Coy Magic Brothers Oil Co.), tung oil, linseed oil, tall oil, safflower oil, sunflower oil, canola oil, dehydrated castor oil, perilla oil, hemp seed oil walnut oil or mixtures thereof. The diluted varnish base (including alkyd, phenolic resin and solvent) typically has a weight average molecular weight of about 1000 to about 2000 as measured by gel permeation chromatography. It is believed that the alkyd and resin bind to form a macromolecule.

MAKING THE INKS

To make the ink, the varnish is mixed with the other ingredients such as pigment, emulsifier (surfactant), extenders, wax, solvents such as mineral oil, glycols and/or glycol ethers, driers, drying oils, resins, other alkyds, water and other conventional ingredients known to one skilled in the art.

The varnish and other ingredients are mixed, typically in a mixer for about 15 minutes. Then the mixture passes twice through another mixer, such as a three roll mill, to further mix the ingredients. Then diluents, which include any of the above-listed "other ingredients" are added to achieve proper ink parameters such as viscosity or color.

For example to make green ink, the varnish and other ingredients are typically mixed in one step. To make black ink, the varnish and black iron oxide (a pigment), and a solvent may be mixed to make an ink base. Then the other ingredients are added. In the alternative, the varnish and all the other ink ingredients may be mixed in one step.

The pigments include any typical pigment for sheetfed intaglio printing. This includes ferric oxide, calcium oxide, zinc oxide, antimony oxide, zinc chromate, carbon black, and mixtures thereof.

For the printing of security documents, especially currency, the preferred pigments are CI Pigment Yellow 12, CI Pigment Yellow 42, CI Pigment Black 7, CI Pigment Black 11, CI Pigment Red 9, CI Pigment Red 23, CI Pigment Red 146, CI Pigment REd 224, CI Pigment Green 7, CI Pigment Green 36, CI Pigment Blue 15:3, CI Pigment Violet 23 and CI Pigment Violet 32.

The emulsifiers are preferably insoluble in water at room temperature, but soluble in water at about 50° to about 75° C. Emulsifiers, i.e., surfactants include anionic, non-ionic, and cationic surfactants, macromolecular compounds, amphoteric compounds or mixtures thereof. The anionic surfactants include amine salts of alkyl aryl sulfonate, sodium, lithium or potassium salts of castor oil sulphonate, or Atlas G-3300, alkyl aryl sulfonate amine salt (a 90% active amine salt of an alkylbenzene sulfonic acid) manufactured by Stepan Company. Atlas G-3300 is preferred because it is insoluble in water at room temperature, but soluble at 60° C. which is where a wiper roll in intaglio printing washes excess ink off of currency "white" areas so one may subsequently print fine lines. Non-ionic surfactants include MAKON 8, an alkylphenoxy polyethylene ethanol manufactured by Stepan Chemical Company. The cationic surfactants include salts of epoxy resins or modified epoxy resins with tertiary or secondary amino groups, or quaternary ammonium chloride, manufactured by Tomah Products Inc., a Division of Exxon Chemical Co. Macromolecular surfactants include polyamines, polyethers, or vinyl polymers. Amphoteric compounds include those containing acidic and basic groups, e.g., Tego-Betain S, manufactured by Goldshmidt Chemical Co.

Extenders include china clay, barium sulfate, calcium carbonate, calcium sulfate, kaolin, talc, silica, corn starch, titanium dioxide or mixtures thereof.

Wax includes polytetrafluoroethylene waxes, polyethylene waxes, Fisher-Tropsch waxes, silicone fluids or mixtures thereof.

Solvents include mineral oils, glycol ethers, benzene, toluene, xylene, naphtha, mineral spirits, hexane, iso-octane, petroleum ether or mixtures thereof. Suitable glycols include, ethylene glycol monomethyl ether, diethylene glycol monomethyl ether, dipropylene glycol monomethyl ether, tripropylene glycol monomethyl ether, propylene glycol monomethyl ether and mixtures thereof. A preferred ether is CARBITOL, a diethylene glycol monoethyl ether manufactured by Inland Leidy Inc., Baltimore, Md.

The driers include metal salt driers which are heavy metal salts of complex fatty acids. These include lead, cobalt, manganese, cerium calcium, zirconium or zinc salts of naphthionic acids, neodecanoic acids, linoleic acids, octanoic acids, nonanoic acids, and tall oil acids.

The drying oils include raw tung oil and other drying oils. The tung oil may be bodied to increase its viscosity by heating to about 200° C.

The resins include phenolic resins or alkyd combinations with hydrocarbon resins, thermoplastic phenolic resins (other than those in the varnish), tung/phenolic adduct resins, rosin adduct resins (preferably adducts with maleic anhydride), maleic resins or mixtures thereof.

Alkyds (other than those in varnish) including SOLVAR manufactured by Lawter International, Inc., Northbrook, Ill. or 100S manufactured by Lawter International, Inc., Northbrook, Ill., or alkyd combinations with hydrocarbons.

An advantage of the inks of the present invention is that they have low levels of volatile organic compounds (VOC). Total volatiles are determined by ASTM D 2369. Then the water is subtracted by ASTM D 3792 to determine the VOC %. Preferably, the VOC ranges from about 3 to about 10.

The invention is further illustrated by the following non-limiting examples:

EXAMPLES 1–4

The steps of the examples are as follows:

The alkyd-modified soybean oil-containing material were prepared by combining lithium acetate, tung oil, soybean oil, pentaerythritol and trimellitic anhydride (hereinafter TMA) listed in Table I at conditions suitable for soybean oil, tung oil and TMA to form an alkyd-containing varnish.

In general, the alkyd-modified drying oil was made by mixing tung oil, soybean oil, pentaerythritol and lithium acetate at 220° C. for about 45 to about 60 minutes. The pentaerythritol was initially added as a white solid, but it dissolved during the 45 minute mixing time. This dissolving indicated that it underwent an alcoholysis reaction with the soybean oil and tung oil.

The temperature was dropped to about 175 ° C. and trimellitic anhydride was added and the mixture was held at a temperature between about 165° and about 180° C. for about 10 to about 30 minutes. The resulting alkyd-containing varnish was then cooled to ambient temperature.

The varnish was then diluted with a solvent as listed in TABLE II.

EXAMPLES 5–9

The diluted varnish of Examples 1–4 were mixed with pigments and other ingredients as shown on Table III to make green or black cylinder wipe currency ink. The inks were evaluated for the properties listed in Tables IV–VII. As shown in Tables IV–VII, the currency was subjected to chemicals for 24 hours, rubbing in the presence of chemicals, and physical resistance tests. The currency was subjected to the standard quality control tests seven days after printing.

The varnishes were based on alkyds made at the Bureau of Engraving and Printing in five gallon pilot quantities where the drying oil contents of the varnish were varied from 51% soybean oil (Examples 1 and 2), 25% soybean oil (Example 3), and 5% soybean oil (Example 4), respectively, the remainder of the oil being tung oil. The 51% soybean oil varnish did not have sufficient alkali resistance in two green inks tried in production, but passed all other chemical and physical resistance testing. The 25% soybean oil varnishes when incorporated into inks, did have sufficient resistance as did the 5% soybean oil varnishes.

Most of the results were equivalent to the commercial inks already in use at the Bureau of Engraving and Printing with the exception of set-off. Set-off is a factor of ink formulation. The set-off phenomenon is not considered to be related to use of soybean oil and does not prevent use of the formulations at present.

These inks wiped very easily which is an indication of potential reduction in wiper roller wear. Two of the inks, namely those of Examples 7 and 8 satisfy and address specifically the issues raised in Report 101-589 from the U.S. House of Representatives Committee on Appropriations as follows:

1. The inks based on soybean oil are comparable in cost to present currency inks.
2. The press trials indicate no unusual problems with equipment compatibility and may show improvements in runability, using less total press amperage due to the soybean oil-based ink, which translates into reduced downtime on presses and lower production costs attributable to a reduction in wiper roller replacement.
3. Reproduction quality is excellent.
4. Security against counterfeiting has presented no problems and non are expected.

This report addresses the currency printing area only, but results could be applied to postage stamps and securities following further development.

TABLE I

Step 1: Alkyd Modified Soybean Oil Varnish Preparation

| Example No. | 1 | 2 | 3 | 4 |
|---|---|---|---|---|
| Materials | % | % | % | % |
| Li Acetate | 0.1 | 0.2 | 0.2 | 0.2 |
| Tung Oil | 36.4 | 39.3 | 60.1 | 76.3 |
| Soybean Oil | 37.8 | 40.8 | 20.0 | 4.1 |
| Pentaerythritol | 3.9 | 4.2 | 4.2 | 4.2 |
| TMA* | 21.8 | 15.5 | 15.5 | 15.2 |
|  | 100 | 100 | 100 | 100 |
| *Trimellitic Anhydride | | | | |
| Acid Number | 89.0 | 91.25 | 72.0 | 78.4 |

TABLE II

Step 2: Alkyd Modified Soybean Oil Varnish of Step 1 With Solvent

| Example | 1 | 2 | 3 | 4 |
|---|---|---|---|---|
| Hexylene Glycol | 18.3 | — | — | — |
| MAGIESOL 470 Oil* | — | 23.9 | 20.6 | 20 |
| Varnish | 81.7 | 76.1 | 65.4 | 65.1 |
| Tung Oil | — | — | 14 | 14.9 |
| TOTALS: | 100 | 100 | 100 | 100 |

*Mineral Oil Solvent by Magie Brothers Oil Company, division of Pennzoil Corp.

TABLE III

Step 3: Ink Production from Diluted Varnish of Step 2

| Example | 5 | 6 | 7 | 8 |
|---|---|---|---|---|
| Colors | Green | Green | Green | Black ke |
| Varnish of Example 1 | 32 | — | — | — |
| Varnish of Example 2 | — | 34.4 | — | — |
| Varnish of Example 3 | — | — | 4.8 | 23.4 |
| Varnish of Example 4 | — | — | 34.3 | — |
| Green Base[1] | 6 | 6.1 | 2.9 | — |
| F.B. Base[2] | 3 | 1.9 | 2.3 | — |
| Yellow Iron Oxide[3] | 11 | 11.2 | 6.5 | — |
| Atlas G-3300[4] | 2 | 2.1 | 3.6 | 3.6 |
| Calcium Carbonate[5] | 40 | 41.1 | 39.2 | 27.8 |
| 470 Solvent[6] | — | — | — | 4.6 |
| Tung Oil[7] | — | — | — | — |
| Cobalt 5.6%[8] | 1.6 | 1.6 | 0.9 | 1.6 |
| MN Hydrocure 8%[9] | 1.4 | 1.6 | 0.9 | 0.8 |
| Hexylene Glycol | 3 | — | — | — |
| CC 5029D Wax[10] | — | — | 4.6 | 3.8 |
| Black Iron Oxide | — | — | — | 27 |
| Chinawood Oil 40007[11] | — | — | — | 5.8 |
| Dry Furnace Black[12] | — | — | — | 1.6 |
| TOTALS WT. %: | 100 | 100 | 100 | 100 |
| Grind, NAPIRI[13] | 3 | 9 | 4 | 4 |

[1]Green base pigment dispersed in a flush alkyd, General Press Color, Inc., Addison, Illinois
[2]Furnace black base, 50/50 weight percent mixture of furnace black and alkyd, i.e., SOLVAR, by Lawter International, Inc., Northbrook, Illinois
[3]Columbian Chemical Company, Atlanta, Georgia
[4]Stepan Chemical Co., Northfield, Illinois
[5]Precipitated calcium carbonate, Specialty Minerals, Inc., New York, New York
[6]470° F. boiling point mineral oil, Magie Brothers Oil Co., Franklin Park, Illinois
[7]Deegan Oil and Chemical Co., Jersey City, New Jersey
[8]Sinclair and Valentine, St. Paul, Minnesota
[9]Mooney Chemical Inc., Cleveland, Ohio
[10]Carrol Scientific, Countryside, Illinois
[11]Deegan Oil and Chemical Co., Jersey City, New Jersey
[12]Columbian Chemical Company, Atlanta, Georgia
[13]Gauge Number - National Printing Ink Research Institute

TABLE IV

Audit Test Results
Chemical and Physical Resistance

| Ink Identification Denomination | | Example 5 $1.00 |
|---|---|---|
| | | RESULTS IN COMPARISON TO STANDARD |
| TEST | Inferior | Equal |
| I. Chemical Resistance (24 hours) | | |
| 1. 1% Sulfuric Acid | | X |
| 2. 2% Sodium Hydroxide | X | |
| 3. 1:4 Bleach Solution | X | |
| 4. Ethanol | | X |
| 5. Perchloroethylene | | X |
| 6. Toluene | | X |
| 7. Acetone | | X |
| 8. Gasoline (Unleaded) | | X |
| 9. Mineral Spirits | | X |
| II. Chemical Rub Resistance (20 Strokes) | | |
| 1. 1% Sulfuric Acid | | X |

TABLE IV-continued

Audit Test Results
Chemical and Physical Resistance

| Ink Identification | Example 5 |
|---|---|
| Denomination | $1.00 |

| | TEST | RESULTS IN COMPARISON TO STANDARD | |
|---|---|---|---|
| | | Inferior | Equal |
| | 2. 2% Sodium Hydroxide | X | |
| | 3. 1:4 Bleach Solution | | X |
| | 4. Ethanol | | X |
| | 5. Perchloroethylene | | X |
| | 6. Toluene | | X |
| | 7. Acetone | | X |
| | 8. Gasoline (Unleaded) | | X |
| | 9. Mineral Spirits | | X |
| III. | Physical Resistance | | |
| | A. Light Fastness (72 hours) | | X |
| | B. Crumple (32X)* | | 6.0 |
| | C. Laundry* | | 3.7 |
| | D. Magnetic Properties | | X |

*Acceptance Criteria: Rating of 4 or Greater

TABLE V

Audit Test Results
Chemical and Physical Resistance

| Ink Identification | Example 6 |
|---|---|
| Denomination | $1.00 |

| | TEST | RESULTS IN COMPARISON TO STANDARD | |
|---|---|---|---|
| | | Inferior | Equal |
| I. | Chemical Resistance (24 hours) | | |
| | 1. 1% Sulfuric Acid | | X |
| | 2. 2% Sodium Hydroxide | X | |
| | 3. 1:4 Bleach Solution | X | |
| | 4. Ethanol | | X |
| | 5. Perchloroethylene | | X |
| | 6. Toluene | | X |
| | 7. Acetone | | X |
| | 8. Gasoline (Unleaded) | | X |
| | 9. Mineral Spirits | | X |
| II. | Chemical Rub Resistance (20 Strokes) | | |
| | 1. 1% Sulfuric Acid | | X |
| | 2. 2% Sodium Hydroxide | X | |
| | 3. 1:4 Bleach Solution | X | |
| | 4. Ethanol | | X |
| | 5. Perchloroethylene | | X |
| | 6. Toluene | | X |
| | 7. Acetone | | X |
| | 8. Gasoline (Unleaded) | | X |
| | 9. Mineral Spirits | | X |
| III. | Physical Resistance | | |
| | A. Light Fastness (72 hours) | | X |
| | B. Crumple (32X)* | | 5.3 |
| | C. Laundry* | | 3.9 |
| | D. Magnetic Properties | | X |

*Acceptance Criteria: Rating of 4 or Greater

TABLE VI

Audit Test Results
Chemical and Physical Resistance

| Ink Identification | Example 7 |
|---|---|
| Denomination | $1.00 |

| | TEST | RESULTS IN COMPARISON TO STANDARD | |
|---|---|---|---|
| | | Inferior | Equal |
| I. | Chemical Resistance (24 hours) | | |
| | 1. 1% Sulfuric Acid | | X |
| | 2. 2% Sodium Hydroxide | X | |
| | 3. 1:4 Bleach Solution | | X |
| | 4. Ethanol | | X |
| | 5. Perchloroethylene | | X |
| | 6. Toluene | | X |
| | 7. Acetone | | X |
| | 8. Gasoline (Unleaded) | | X |
| | 9. Mineral Spirits | | X |
| II. | Chemical Rub Resistance (20 Strokes) | | |
| | 1. 1% Sulfuric Acid | | X |
| | 2. 2% Sodium Hydroxide | | X |
| | 3. 1:4 Bleach Solution | | X |
| | 4. Ethanol | | X |
| | 5. Perchloroethylene | | X |
| | 6. Toluene | | X |
| | 7. Acetone | | X |
| | 8. Gasoline (Unleaded) | | X |
| | 9. Mineral Spirits | | X |
| III. | Physical Resistance | | |
| | A. Light Fastness (72 hours) | | X |
| | B. Crumple (32X)* | | 5.3 |
| | C. Laundry* | | 5.6 |
| | D. Magnetic Properties | | X |

*Acceptance Criteria: Rating of 4 or Greater

TABLE VII

Audit Test Results
Chemical and Physical Resistance

| Ink Identification | Example 8 |
|---|---|
| Denomination | $1.00 |

| | TEST | RESULTS IN COMPARISON TO STANDARD | |
|---|---|---|---|
| | | Inferior | Equal |
| I. | Chemical Resistance (24 hours) | | |
| | 1. 1% Sulfuric Acid | | X |
| | 2. 2% Sodium Hydroxide | X | |
| | 3. 1:4 Bleach Solution | X | |
| | 4. Ethanol | | X |
| | 5. Perchloroethylene | | X |
| | 6. Toluene | | X |
| | 7. Acetone | | X |
| | 8. Gasoline (Unleaded) | | X |
| | 9. Mineral Spirits | | X |
| II. | Chemical Rub Resistance (20 Strokes) | | |
| | 1. 1% Sulfuric Acid | | X |
| | 2. 2% Sodium Hydroxide | | X |
| | 3. 1:4 Bleach Solution | | X |
| | 4. Ethanol | | X |

TABLE VII-continued

Audit Test Results
Chemical and Physical Resistance

| Ink Identification | Example 8 |
|---|---|
| Denomination | $1.00 |

| | RESULTS IN COMPARISON TO STANDARD | |
|---|---|---|
| TEST | Inferior | Equal |
| 5. Perchloroethylene | | X |
| 6. Toluene | | X |
| 7. Acetone | | X |
| 8. Gasoline (Unleaded) | | X |
| 9. Mineral Spirits | | X |
| III. Physical Resistance | | |
| A. Light Fastness (72 hours) | | X |
| B. Crumple (32X)* | 3.8 | |
| C. Laundry* | 5.4 | |
| D. Magnetic Properties | | X |

*Acceptance Criteria: Rating of 4 or Greater

EXAMPLE 9

A varnish comprising alkyd, phenolic resin and solvent was made as follows.

The alkyd was made by mixing 46.33 parts by weight tung oil, 15.47 parts by weight soybean oil, and 3.71 parts by weight pentaerythritol in the presence of 0.09 parts by weight lithium acetate di-hydrate at about 220° C. for about 45 minutes. Then 8.84 parts by weight of trimellitic anhydride is added and the mixture was mixed at about 175° C. for about ten minutes.

The phenolic resin for the varnish was made by mixing a mixture of 8.707 parts by weight t-butyl phenol (b.p. 224° C.), 1.628 parts by weight bisphenol A, 0.035 parts by weight oxalic acid, and 2.190 parts by weight paraformaldehyde (m.p. 120°–170° C.) to form a mixture. The mixture was heated over a period of 30 minutes to a temperature of about 130° C. The mixture was then heated over a period of 35 minutes to a temperature of about 195° C. This heating occurred under reflux. At this point the mixture had a Gardner/Holdt viscosity of "D". The mixture was then cooled to yield a phenolic resin having a Gardner/Holdt viscosity for 60% nonvolatiles (NV) in xylene of "D" at room temperature. Subsequently, the mixture was reheated without reflux (with a take off condenser to remove water) from ambient to about 280° C. over a period of about 45 minutes and then the mixture was held at about 260° C. for about 1 hour and then cooled. This resulted in a phenolic resin-containing mixture having a Gardner-Holdt viscosity in 60% NV xylene of about "H¼".

The final step was to heat the resin-containing mixture over a period of about 30 minutes to about 300° C. The mixture was held at about 300° C. for about 20 minutes. The resulting phenolic resin-containing material had a Gardner-Holdt viscosity, in 60% NV/xylene, of "V+½" and a solubility of 35.1 NV in ethanol. Moreover, the resulting material was a solid and subsequently flaked.

Then the alkyl-containing varnish was made by mixing the 74.44 parts of alkyl, 12.56 parts of phenolic resin and 13.00 parts of MAGIESOL 44 mineral oil (b.p. 440° F.) were mixed at a temperature of about 175° C. and mixed for about 10 minutes until the resin flake dissolved.

EXAMPLE 10

To make green ink, a varnish made by a method essentially similar to that described by Example 9 was mixed with pigments and other ingredients as listed in TABLE VIII. The varnish and other ingredients were mixed well and ground two times in a three roll mill.

TABLE VIII

| INGREDIENTS | WEIGHT % | MANUFACTURER |
|---|---|---|
| Alkyd-containing Varnish | 18.42 | Made by method essentially similar to that of Example 9 |
| 100S Varnish | 8.71 | Lawter International, Northbrook, Illinois |
| MAGIESOL 52 Oil | 3.86 | Magie Brothers Oil Company, Franklin Park, Illinois |
| Cobalt 5.6% Drier | 1.09 | Mooney Chemicals Inc., Cleveland, Ohio |
| Manganese Linall Drier (6%) | 1.98 | Mooney Chemicals Inc., Cleveland, Ohio |
| Special Furnace Black | 1.88 | Columbian Chemical Corp., Atlanta, Georgia |
| Yellow Iron Oxide | 12.77 | Columbian Chemical Corp, Atlanta, Georgia |
| Peer Green 9501 | 3.76 | Peer Chemical Corp., Wheeling, Illinois |
| G3300 | 0.99 | Stepan Chemical Co., Northfield, Illinois |
| CC-5029 D Wax | 3.86 | Carrol Scientific Inc., Countryside, Illinois |
| Corn Starch | 3.86 | CPC Int'l/Argo, Argo, Illinois |
| Ethyl Carbitol | 0.99 | Aldrich Chem, Milwaukee, Wisconsin |
| Calcium Carbonate | 37.83 | Specialty Minerals Inc., New York New York |
| TOTAL WEIGHT % | 100.00 | |

The ink of Example 10 was printed onto $1 bills and tested. The ink achieved the results listed in TABLE IX in standard currency durability tests.

TABLE IX

| TEST | ACCEPTANCE CRITERIA | RESULTS (7–10 DAYS) |
|---|---|---|
| Crumple, Face | Rating of 4 or Greater | N/A |
| Crumple, Back | Rating of 4 or Greater | 6.0 |
| Crumple, IMP | Rating of 4 or Greater | N/A |
| Laundry, Face | Rating of 4 or Greater | N/A |
| Laundry, Back | Rating of 4 or Greater | 6.0 |
| Laundry, IMP | Rating of 4 or Greater | N/A |

TABLE IX-continued

| TEST | ACCEPTANCE CRITERIA | RESULTS (7–10 DAYS) |
| --- | --- | --- |
| Rub Failure, Face | 3 or Less Solvents | N/A |
| Rub Failure, Back | 3 or Less Solvents | Acetone |
| Soak Failure, Face | 3 or Less Solvents | N/A |
| Soak Failure, Back | 3 or Less Solvents | None |

EXAMPLE 11

To make black ink, a black base was made by mixing and twice grinding the composition listed in TABLE X. Then the black base was mixed with the varnish of Example 10, pigments, and other ingredients listed in TABLE XI (that were also well mixed and then ground two times).

TABLE X

| INGREDIENTS | WEIGHT % | MANUFACTURER |
| --- | --- | --- |
| 100S Varnish | 22.7 | Lawter International, Inc., Northbrook, Illinois |
| Black Iron Oxide | 68.2 | Harcros Pigments, Inc., Fairview Heights, Illinois |
| MAGIESOL 52 Oil | 9.1 | Magie Brothers Oil Co., Franklin Park, Illinois |
| TOTAL WEIGHT % | 100.0 | |

TABLE XI

| INGREDIENTS | WEIGHT % | MANUFACTURER |
| --- | --- | --- |
| Alkyd-containing Varnish | 17.8 | See Example 10 |
| Black Base | 38.5 | See Table X |
| MAGIESOL 52 Oil | 1.9 | Magie Brothers Oil Co., Franklin Park, Illinois |
| Spec. Furnace Black | 1.9 | Columbian Chemicals, Atlanta, Georgia |
| CC5029-D WaX | 3.7 | Carrol Scientific, Countryside, Illinois |
| MN LINALL Drier | 1.9 | Mooney Chemicals, Inc., Cleveland, Ohio |
| Cobalt Drier | 1.9 | Mooney Chemicals, Inc., Cleveland, Ohio |
| Corn Starch | 3.8 | CPC/Argo Int'l, Argo, Illinois |
| G3300 | 1 | Stepan Chemical Company, Northfield, Illinois |
| Ethyl CARBITOL | 1 | Diethlene glycol monoethyl ether, by Inland Leidy Inc., Baltimore, Maryland |
| Precipitated Calcium Carbonate | 27.6 | Specialty Minerals, Inc., New York, New York |
| TOTAL | 100% | |

EXAMPLE 12

Black ink was also made by mixing the varnish of Example 10 and other ingredients of TABLE XII thoroughly and grinding the mixture twice.

TABLE XII

| INGREDIENTS | WEIGHT % | MANUFACTURER |
| --- | --- | --- |
| Alkyd-containing Varnish | 18.27 | See Example 10 |
| Regular Tung Oil | 3.85 | DEEGAN Oil Co., Jersey City, New Jersey |
| 52 Oil | 2.88 | Magie Brothers Oil Company, Franklin Park, Illinois |
| SOLVAR | 4.81 | Low Viscosity Alkyd by Lawter International, Inc. Northbrook, Illinois |
| Manganese Linall Drier | 0.96 | Mooney Chemicals Inc., Cleveland, |

TABLE XII-continued

| INGREDIENTS | WEIGHT % | MANUFACTURER |
|---|---|---|
| 6% | | Ohio |
| Cobalt 5.6% Drier | 0.96 | Mooney Chemicals Inc., Cleveland, Ohio |
| Special Furnace Bk | 1.92 | Columbian Chemical Corp., Atlanta, Georgia |
| Black Iron Oxide | 26.92 | Harcros Pigments, Fairview Heights, Illinois |
| Wax CC5029-D | 3.85 | Carrol Scientific, Countryside, Illinois |
| G3300 | 4.81 | Stepan Chemical Co., Northfield, Illinois |
| Corn Starch | 3.85 | CPC/ARGO, Argo, Illinois |
| Calcium Carbonate | 26.92 | Specialty Mineral, Inc., New York, New York |
| TOTAL WEIGHT % | 100.00 | |

EXAMPLE 13

An ink similar to that of Example 12 was printed onto $1 bills and tested. The ink achieved the results listed in TABLE XIII in standard currency durability tests.

TABLE XIII

| TEST | ACCEPTANCE CRITERIA | RESULTS (7–10 DAYS) |
|---|---|---|
| Crumple, Face | Rating of 4 or Greater | 4.0 |
| Crumple, Back | Rating of 4 or Greater | N/A |
| Crumple, IMP | Rating of 4 or Greater | N/A |
| Laundry, Face | Rating of 4 or Greater | 5.6 |
| Laundry, Back | Rating of 4 or Greater | N/A |
| Laundry, IMP | Rating of 4 or Greater | N/A |
| Rub Failure, Face | 3 or Less Solvents | EtOH, Tolu, Acet |
| Rub Failure, Back | 3 or Less Solvents | N/A |
| Soak Failure, Face | 3 or Less Solvents | None |
| Soak, Failure, Back | 3 or Less Solvents | N/A |

While specific embodiments of the invention have been shown and described, it should be apparent that many modifications can be made thereto without departing from the spirit and scope of the invention. Accordingly, the invention is not limited by the foregoing description, but is only limited by the scope of the claims appended hereto.

I claim:

1. An intaglio ink composition comprising:
   about 5 to about 30 weight percent of a varnish,
   the varnish comprising about 30 to about 100 weight percent alkyd, about 0 to about 70 weight percent of a thermoplastic novolak resin, about 0 to about 25 weight percent solvent, and an emulsifier,
   the alkyd comprising, on a 100 parts by weight alkyd basis, the reaction product of reacting a mixture comprising about 5 to about 50 parts by weight soybean oil, about 0 to about 70 parts by weight tung oil or linseed oil, and about 2 to about 10 parts by weight pentaerythritol in the presence of about 0.05 to about 2 parts by weight alcoholysis catalyst to form alcoholized oil, and reacting the alcoholized oil with about 5 to about 30 parts by weight trimellitic anhydride.

2. The intaglio ink of claim 1, wherein the catalyst comprises lithium acetate and about 0.05 to about 0.5 parts by weight of the alkyd is the catalyst.

3. The intaglio ink of claim 1, wherein the alkyd is the reaction product of reacting a mixture comprising about 10 to about 30 parts by weight soybean oil, about 20 to about 70 parts by weight tung oil, and about 2 to about 5 parts by weight pentaerythritol in the presence of about 0.05 to about 0.5 parts by weight alcoholysis catalyst to form the alcoholized oil, and reacting the alcoholized oil with about 10 to about 20 parts by weight trimellitic anhydride.

4. The intaglio ink of claim 1, wherein said emulsifier being selected from an amine salt of an alkyl aryl sulfonate.

5. The intaglio ink of claim 1, wherein the ink comprises about 50 to about 90 weight percent alkyd, about 5 to about 30 weight percent novolak resin, and about 10 to about 20 weight percent solvent.

6. The intaglio ink of claim 1, wherein said emulsifier being insoluble in water at room temperature and soluble in water at about 40° to about 80° C.

7. The intaglio ink of claim 5, wherein the novolak resin is a reaction product of a mixture of about 30 to about 90 weight percent alkyl-modified phenol, about 5 to about 25 weight percent of unsubstituted or substituted bisphenol, and formaldehyde, combined in the presence of an acid, and the phenolic novolak resin has a melting point of about 140° to about 200° C.

8. The intaglio ink of claim 7, wherein the alkyl-modified phenol is selected from the group consisting of tert-butyl phenol, nonylphenol and mixtures thereof, the bisphenol is bisphenol A, the formaldehyde is in a form selected from the group consisting of formalin, trioxane, paraformaldehyde, and mixtures thereof, the acid is selected from the group consisting of oxalic acid, maleic acid, phosphoric acid, organic mono basic acids, organic di-basic acids and mixtures thereof.

9. The intaglio ink of claim 1, further comprising about 15 to about 50 weight percent pigment, about 10 to about 50 weight percent extenders, about 1 to about 10 weight percent wax, about 0 to about 12 weight percent mineral oil, about 0.5 to about 10 weight percent of a member of the group consisting of glycols, glycol ethers and mixtures thereof, about 0.1 to about 5 weight percent driers, about 0 to about 20 weight percent water, about 0 to about 25 weight percent drying oil, about 0 to about 25 weight percent alkyds other than those in the varnish, and 0 to about 25 weight percent phenolic resins other than those in the varnish and about 0 to about 25 weight percent phenolics, wherein 0 to about 25 weight percent of the varnish is a solvent, wherein the ink comprises about 0.5 to about 10 weight percent emulsifier.

10. The intaglio ink of claim 1, wherein the emulsifier is insoluble in water at room temperature and soluble in water at about 40°–80° C.

11. A method for making an intaglio ink composition comprising the steps of:
   forming a mixture comprising about 5 to about 30 weight percent of a varnish, the varnish comprising about 30 to about 100 weight percent alkyd, about 0 to about 70 weight percent of a thermoplastic novolak resin, about 0 to about 25 weight percent solvent, and an emulsifier; and forming the alkyd on a 100 parts by weight alkyd basis by reacting a mixture comprising about 5 to about 50 parts by weight soybean oil, and about 0 to about 70 parts by weight tung oil or linseed oil, with about 2 to about 10 parts by weight pentaerythritol, in the presence of about 0.05 to about 2 parts by weight catalyst to form an alcoholized oil, and reacting the alcoholized oil with about 5 to about 30 parts by weight trimellitic anhydride.

12. The method of claim 11, wherein the catalyst comprises lithium acetate and about 0.05 to about 0.5 parts by weight of the alkyd is the catalyst.

13. The method of claim 11, wherein the alkyd is the reaction product of reacting a mixture comprising about 10 to about 30 parts by weight soybean oil, about 20 to about 70 parts by weight tung oil, and about 2 to about 5 parts by weight pentaerythritol in the presence of about 0.05 to about 0.5 parts by weight alcoholysis catalyst to form the alcoholized oil, and reacting the alcoholized oil with about 10 to about 20 parts by weight trimellitic anhydride.

14. The method of claim 11, wherein said emulsifier being selected from an amine salt of an alkyl aryl sulfonate.

15. The method of claim 11, wherein the ink comprises about 50 to about 90 weight percent alkyd, about 5 to about 30 weight percent novolak resin, and about 10 to about 20 weight percent solvent.

16. The method of claim 11, wherein said emulsifier being insoluble in water at room temperature and soluble in water at about 40° to about 80° C.

17. The method of claim 15, wherein the novolak resin is a reaction product of a mixture of about 30 to about 90 weight percent alkyl-modified phenol, about 5 to about 25 weight percent of unsubstituted or substituted bisphenol, and formaldehyde, combined in the presence of an acid catalyst and the novolak resin has a melting point of about 140° to about 200° C.

18. The method of claim 17, wherein the alkyl-modified phenol is selected from the group consisting of tert-butyl phenol, nonylphenol and mixtures thereof, the bisphenol is bisphenol A, the formaldehyde is in a form selected from the group consisting of formalin, trioxane, paraformaldehyde, and mixtures thereof, the acid is selected from the group consisting of oxalic acid, maleic acid, phosphoric acid, organic mono basic acids, organic di-basic acids and mixtures thereof.

19. The method of claim 11, further comprising about 15 to about 50 weight percent pigment, about 10 to about 50 weight percent extenders, about 1 to about 10 weight percent wax, about 0 to about 12 weight percent mineral oil, about 0.5 to about 10 weight percent of a member of the group consisting of glycols, glycol ethers and mixtures thereof, about 0.1 to about 5 weight percent driers, about 0 to about 20 weight percent water, about 0 to about 25 weight percent drying oil, about 0 to about 25 weight percent alkyds other than those in the varnish, and 0 to about 25 weight percent phenolic resins other than those in the varnish and about 0 to about 25 weight percent phenolics, wherein 0 to about 25 weight percent of the varnish is a solvent, wherein the ink comprises about 0.5 to about 10 weight percent emulsifier.

20. The method of claim 11, wherein the emulsifier is insoluble in water at room temperature and soluble in water at about 40° to about 80° C.

* * * * *